United States Patent
Fröhlich et al.

(10) Patent No.: US 11,018,539 B2
(45) Date of Patent: May 25, 2021

(54) ELECTRIC MACHINE WITH HELICAL COOLING CHANNELS

(71) Applicant: Continental Automotive GmbH, Hannover (DE)

(72) Inventors: Holger Fröhlich, Berlin (DE); David Charles, Berlin (DE); Sönke Gürtler, Berlin (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 472 days.

(21) Appl. No.: 16/069,445

(22) PCT Filed: Nov. 23, 2016

(86) PCT No.: PCT/EP2016/078585
§ 371 (c)(1),
(2) Date: Jul. 11, 2018

(87) PCT Pub. No.: WO2017/121526
PCT Pub. Date: Jul. 20, 2017

(65) Prior Publication Data
US 2019/0027987 A1     Jan. 24, 2019

(30) Foreign Application Priority Data

Jan. 15, 2016     (DE) .......................... 10 2016 200 423

(51) Int. Cl.
*H02K 1/32*     (2006.01)
*H02K 9/193*     (2006.01)
(Continued)

(52) U.S. Cl.
CPC .............. *H02K 1/32* (2013.01); *H02K 9/193* (2013.01); *H02K 7/116* (2013.01); *H02K 9/19* (2013.01);
(Continued)

(58) Field of Classification Search
CPC .......... H02K 1/32; H02K 1/325; H02K 7/116; H02K 9/02; H02K 9/19; H02K 9/193;
(Continued)

(56) References Cited

U.S. PATENT DOCUMENTS 3,457,439 A    7/1969    Gering et al. .................. 310/52
4,902,922 A *   2/1990    Annovazzi ............. H02K 1/243
                                                                                                              310/263
(Continued)

FOREIGN PATENT DOCUMENTS

CN         103490559 A      1/2014           H02K 5/20
CN         103986263 A      8/2014           H02K 1/32
(Continued)

OTHER PUBLICATIONS

Chinese Office Action, Application No. 201680073657.8, 6 pages, dated Jun. 28, 2019.
(Continued)

*Primary Examiner* — Alex Torres-Rivera
*Assistant Examiner* — David A. Singh
(74) *Attorney, Agent, or Firm* — Slayden Grubert Beard PLLC

(57) ABSTRACT

An electric machine for a drivetrain of a motor vehicle may comprise: a rotor with a rotor laminated core; a stator with winding heads on opposite end faces; and a housing with a a cooling liquid reservoir. The rotor core comprises multiple stacked laminations each with an aperture connecting the end faces to one another. The apertures of adjacent laminations are offset in a circumferential direction so: a first helical cooling channel connects an inner region of the core to a first end face; a second helical cooling channel connects the inner region of the core to a second end face; and the first cooling channel and the second cooling channel are oriented oppositely with respect to one another and are connected via (Continued)

a passage within the rotor laminated core to a feed line conducting the cooling liquid within the rotor shaft.

11 Claims, 7 Drawing Sheets

(51) Int. Cl.
   *H02K 17/16* (2006.01)
   *H02K 7/116* (2006.01)
   *H02K 9/19* (2006.01)

(52) U.S. Cl.
   CPC ......... *H02K 17/16* (2013.01); *H02K 2201/06* (2013.01)

(58) Field of Classification Search
   CPC ...... H02K 9/197; H02K 17/16; H02K 17/165; H02K 17/18; H02K 17/185; H02K 17/20; H02K 17/205; H02K 2201/06
   USPC ................... 310/54, 58, 59, 60 R, 61, 60 A
   See application file for complete search history.

(56) References Cited

U.S. PATENT DOCUMENTS

| | | | | |
|---|---|---|---|---|
| 5,489,810 | A * | 2/1996 | Ferreira | F02N 11/04 310/214 |
| 6,919,656 | B2 * | 7/2005 | Soitu | H02K 1/20 310/52 |
| 2003/0030333 | A1 | 2/2003 | Johnsen | H02K 1/32 310/54 |
| 2003/0173839 | A1 * | 9/2003 | Torii | H02K 11/33 310/52 |
| 2014/0232217 | A1 * | 8/2014 | Miyama | H02K 9/22 310/52 |
| 2014/0246177 | A1 * | 9/2014 | Chamberlin | H02K 9/19 165/104.33 |
| 2014/0246931 | A1 * | 9/2014 | Chamberlin | H02K 5/20 310/54 |
| 2014/0246932 | A1 * | 9/2014 | Chamberlin | H02K 5/20 310/54 |
| 2014/0246933 | A1 * | 9/2014 | Chamberlin | H02K 9/19 310/54 |
| 2014/0265662 | A1 * | 9/2014 | Shoykhet | H02K 1/20 310/59 |
| 2014/0265666 | A1 * | 9/2014 | Shoykhet | H02K 9/19 310/59 |
| 2015/0042185 | A1 * | 2/2015 | Buttner | B60L 50/51 310/54 |
| 2015/0171707 | A1 | 6/2015 | Shoykhet | 310/54 |
| 2015/0280525 | A1 * | 10/2015 | Rippel | H02K 9/24 310/54 |
| 2015/0288255 | A1 * | 10/2015 | Barker | H02K 9/197 310/43 |
| 2016/0261158 | A1 * | 9/2016 | Horii | H02K 1/274 |
| 2016/0322888 | A1 * | 11/2016 | Watanabe | H02K 9/19 |
| 2017/0040872 | A1 * | 2/2017 | Nitsch | H02K 7/116 |
| 2017/0163125 | A1 * | 6/2017 | Granat | H02K 1/32 |
| 2017/0244301 | A1 * | 8/2017 | Isono | F16D 55/30 |
| 2017/0271958 | A1 * | 9/2017 | Kitta | H02K 9/19 |
| 2018/0248442 | A1 * | 8/2018 | Frohlich | H02K 11/33 |
| 2018/0269739 | A1 * | 9/2018 | Brasas | H02K 1/32 |
| 2019/0356187 | A1 * | 11/2019 | Frohlich | H02K 1/276 |

FOREIGN PATENT DOCUMENTS

| | | | |
|---|---|---|---|
| DE | 4414219 A1 | 10/1995 | ............ H02K 1/32 |
| DE | 19650572 A1 | 6/1998 | ............ H02K 9/19 |
| DE | 102008020426 A1 | 10/2009 | ............ H02K 1/32 |
| DE | 102011006280 A1 | 10/2012 | ............ H02K 1/32 |
| JP | 01101147 U | 7/1989 | ............ F16C 37/00 |
| WO | 2007/107132 A1 | 9/2007 | ............ H02K 1/26 |
| WO | 2017/121526 A1 | 7/2017 | ............ H02K 1/32 |

OTHER PUBLICATIONS

German Office Action, Application No. 102016200423.9, 7 pages, dated Aug. 31, 2016.

International Search Report and Written Opinion, Application No. PCT/EP2016/078585, 19 pages dated Feb. 3, 2017.

* cited by examiner

ELECTRIC MACHINE WITH HELICAL COOLING CHANNELS

CROSS-REFERENCE TO RELATED APPLICATIONS

This application is a U.S. National Stage Application of International Application No. PCT/EP2016/078585 filed Nov. 23, 2016, which designates the United States of America, and claims priority to DE Application No. 10 2016 200 423.9 filed Jan. 15, 2016, the contents of which are hereby incorporated by reference in their entirety.

TECHNICAL FIELD

The present disclosure relates to motor vehicles. Various embodiments may include an electric machine for a drivetrain of a motor vehicle.

BACKGROUND

During the operation of electric machines, heat energy is generated due to various losses. To discharge this heat energy, electric machines must be cooled. Electric machines may be part of a motor vehicle drivetrain, in particular for a hybrid drive. To cool the electric machines, it is conventional for air and/or water to be used for cooling the electric machine, and for said cooling medium to be conducted through at least one region of the machine. Here, the cooling of the electric machine may be limited, for example because, by means of a cooling heat exchanger through which cooling water flows, to only certain regions, such as the stator laminated core of the machine, which can be cooled and such cooling is not possible in other regions of the machine.

Against this background, for the stated use, electric machines have become established which are cooled by means of an electrically insulating cooling liquid, for example an oil. Such oil-cooled electric machines not only have a heat exchanger through which oil flows but also exhibit direct cooling in particular of the winding heads or, in a limitation, of the rotor of the electric machine. The electrically insulating cooling liquid is accordingly guided openly over the winding heads within a housing of the electric machine, such that a dissipation of heat over a large area is made possible within the electric machine.

It is furthermore known for electric machines to be cooled predominantly using cooling air (open-circuit ventilation) or cooling liquid (cooling jacket). Cooling with hydrogen is also used in the case of generators. DE 196 50 572 A1 furthermore describes cooling of electric machines by means of an oil sump which is atomized by the rotation of the rotor. This however gives rise to splashing losses, such that the efficiency of an electric machine of said type is not optimal. Since, in the case of electric machines, in particular in the case of asynchronous machines, a major part of the heat is generated in the rotor, in particular in the short-circuiting rings, there is a need to intensively cool these in order to not least also increase the efficiency of the electric machine.

Furthermore, in many usage situations of electric machines, the available structural space is limited. Here, a water jacket or fan that is to be integrated comes at the expense of the structural space for the electric machine itself.

SUMMARY

The teachings of the present disclosure may be embodied in a particularly compact electric machine with high efficiency which permits improved cooling of thermally loaded components of the electric machine. For example, some embodiments may include an electric machine (5) comprising a rotor which is mounted on a rotor shaft (19) and which has a rotor laminated core (2), a stator (28) with stator winding heads (29, 30) which are arranged on opposite end faces of the stator (28), and a housing (26, 26.1, 26.2) with a reservoir (31) for a cooling liquid. The rotor laminated core (2) comprises multiple laminations (7) which are stacked in a stacking direction (L), wherein the laminations (7) each have at least one aperture (8) which connects the end faces (S) of the respective lamination (7) to one another, and wherein the apertures (8) of laminations (7) offset in the stacking direction (L) are arranged offset with respect to one another in a circumferential direction (U) of the laminations (7). At least one first helical cooling channel (9.1) is formed which runs through the rotor laminated core (2) and which connects an inner region (15) of the rotor laminated core (2) to a first end face (16.1) of the rotor laminated core (2). At least one second helical cooling channel (9.2) is formed which runs through the rotor laminated core (2) and which connects the inner region (15) of the rotor laminated core (2) to a second end face (16.2), situated opposite the first end face (16.1), of the rotor laminated core (2). The first cooling channel (9.1) and the second cooling channel (9.2) are oriented oppositely with respect to one another and are connected via at least one passage (17) within the rotor laminated core (2) to a feed line (18), which conducts the cooling liquid, within the rotor shaft (19).

In some embodiments, the feed line (18) comprises a bore (22) which runs axially within the rotor shaft (19) and which connects an inner region (23) of the rotor shaft (19) to an end face (24) of the rotor shaft (19), wherein a connecting line (25) running within the rotor shaft (19) connects the bore (22) to the passage (17).

In some embodiments, multiple first cooling channels (9.1) and second cooling channels (9.2) are formed, which are connected to the feed line (18) within the rotor shaft (19) via multiple radially running passages (17), which are arranged so as to be distributed uniformly along the circumference, within the rotor laminated core (2).

In some embodiments, the rotor (19) has the guide means for guiding the cooling liquid from the rotor (1) to the stator winding heads (29, 30).

In some embodiments, the guide means comprise a centrifuging disk and/or multiple vanes (4) or blades.

In some embodiments, the electric machine (5) is an asynchronous machine with short-circuiting rings (3) arranged on the end faces (16.1, 16.2) of the rotor (1), wherein, on the short-circuiting rings (3), there are arranged blades (4) for guiding the cooling liquid from the rotor (1) to the stator winding heads (29, 30). In some embodiments, the blades (4) are backwardly curved.

In some embodiments, the housing (26) has guide means for guiding the cooling liquid from the rotor (1) to the stator winding heads (29, 30).

In some embodiments, the cooling liquid is not electrically conductive.

In some embodiments, the electric machine (5) has a recirculation cooling circuit (32) with a pump (34) and with a heat exchanger (35) for cooling the electrically insulating cooling liquid.

In some embodiments, further cooling channels for cooling the electrically insulating cooling liquid are arranged in a wall of the housing (26).

BRIEF DESCRIPTION OF THE DRAWINGS

Exemplary embodiments of the teachings herein are discussed in more detail below on the basis of the schematic drawings, in which.

DETAILED DESCRIPTION

Figure 1:
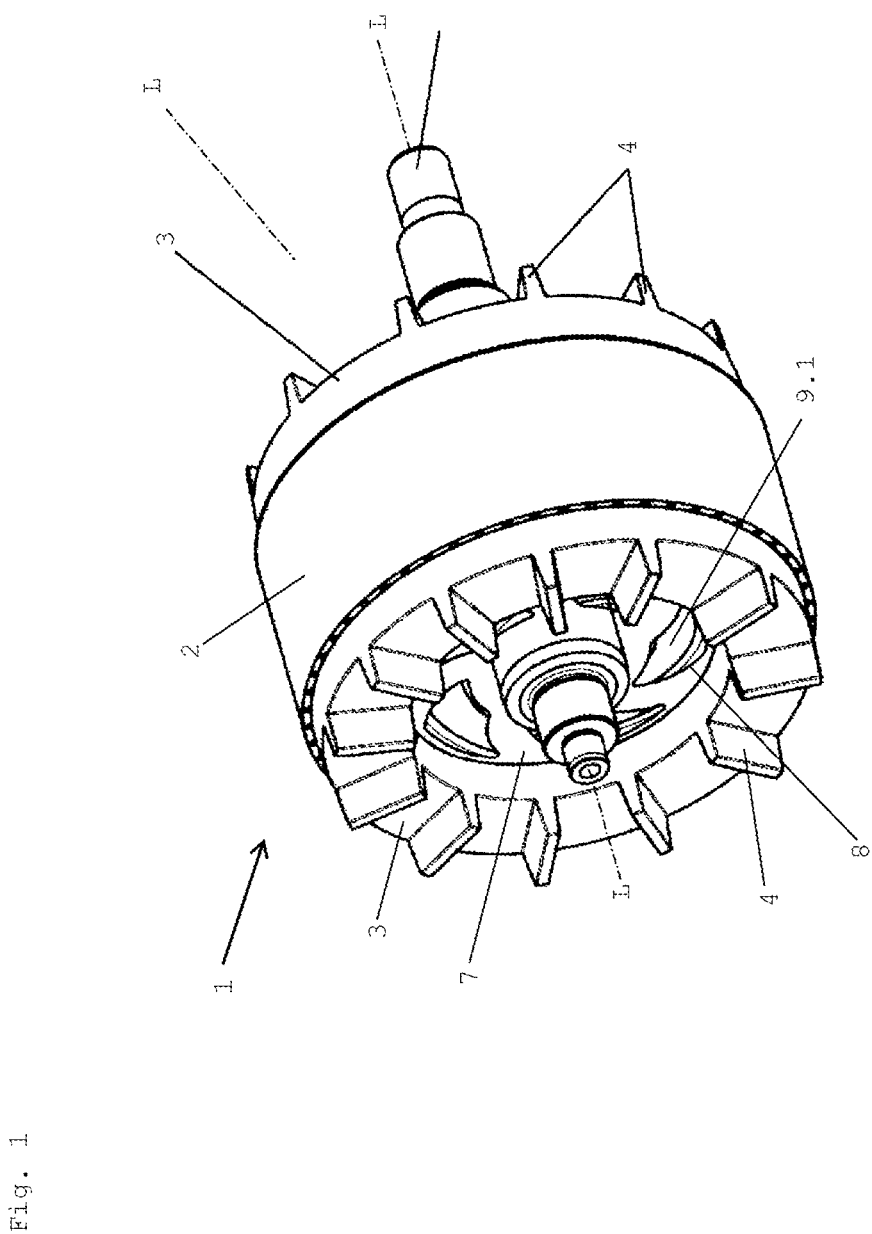
FIG. 1 shows a perspective view of a rotor with a rotor laminated core, with multiple helical cooling channels and with short-circuiting rings, according to the teachings of the present disclosure.

In some embodiments, an electric machine comprises a rotor which is mounted on a rotor shaft and which has a rotor laminated core, a stator with stator winding heads which are arranged on opposite end faces of the stator, and a housing with a reservoir for a cooling liquid. The rotor laminated core comprises multiple laminations which are stacked in a stacking direction, wherein the laminations each have at least one aperture which connects the end faces of the respective lamination to one another. The apertures of laminations which are offset in the stacking direction are arranged offset with respect to one another in a circumferential direction of the laminations such that at least one first helical cooling channel is formed which runs through the rotor laminated core and which connects an inner region of the rotor laminated core to a first end face of the rotor laminated core, and at least one second helical cooling channel is formed which runs through the rotor laminated core and which connects the inner region of the rotor laminated core to a second end face, situated opposite the first end face, of the rotor laminated core.

In some embodiments, the first cooling channel and the second cooling channel are oriented oppositely with respect to one another and are connected via at least one passage within the rotor laminated core to a feed line, which conducts the cooling liquid, within the rotor shaft.

In some embodiments, the stacking direction of the laminations of the rotor laminated core runs in a longitudinal direction of the rotor. The laminations are individual laminations, in particular congruent laminations, which have identical surfaces. In some embodiments, all laminations of the rotor laminated core—with the exception of those laminations of the rotor laminated core which form the at least one passage—may be structurally identical, that is to say are identical components. In some embodiments, the laminations may be substantially ring-shaped, such that the rotor laminated core is of substantially hollow cylindrical form.

In some embodiments, the laminations comprise multiple apertures arranged in a circular-ring-shaped manner for forming winding grooves of the laminated core. The winding grooves may be arranged equidistantly with respect to one another and along an outer circumference of the laminations. Each lamination of the rotor laminated core comprises at least one aperture, which may be arranged between the outer circumference of the lamination, between the winding grooves arranged there, and a central bore of the lamination for the mounting of the lamination on a rotor shaft.

In some embodiments, the apertures of laminations which are offset in the stacking direction are, in the case of congruent winding grooves, arranged offset with respect to one another in a circumferential direction of the laminations. In the assembled laminated core, this leads to a skewing of the apertures, whereby the laminations which are offset in the stacking direction are arranged in spiral-shaped fashion with respect to one another. In other words, the apertures of laminations which are offset in the stacking direction are arranged so as to be rotationally offset or twisted relative to one another such that, overall, the at least one first and the at least one second helical cooling channel are formed. The design of the cooling channels is based on the principle of the Archimedes screw, that is to say the cooling channels form a conveying spiral in the manner of a screw pump. When the rotor laminated core rotates, the helical cooling channels also rotate, and can thus convey cooling liquid through the rotor laminated core.

In some embodiments, the first and the second cooling channel connect the inner region of the rotor laminated core to one end face of the rotor laminated core. The inner region may be an inner cavity which is central in a longitudinal direction of the rotor laminated core, which cavity is at the same distance from both end faces of the rotor laminated core. The inner region may also be a constituent part of the at least one passage which connects the first and the second cooling channel to the feed line, which conducts the cooling liquid, within the rotor shaft, and said inner region runs for example in a radial direction within the rotor laminated core. The at least one passage may furthermore have a slot, a groove, and/or a bore. In some embodiments, multiple such passages of the rotor laminated core to be provided, which are arranged so as to be distributed uniformly along the circumference, whereby a uniform cooling action can be achieved.

In some embodiments, the cooling liquid is fed to the inner region of the rotor laminated core via the feed line of the rotor shaft and via the passage, wherein said cooling liquid may include cooling liquid that has been re-cooled. In other words, the rotor shaft and the rotor laminated core together form a feed device for cooling liquid, wherein, when the rotor laminated core rotates, the helical cooling channels can draw in coolant via the feed line of the rotor shaft and via the at least one passage of the rotor laminated core, can convey said coolant through the cooling channels, and can centrifuge said coolant onto the stator winding heads.

In some embodiments, the first and the second cooling channel are oriented oppositely with respect to one another, that is to say the conveying directions of the conveying spirals formed by the cooling channels point in mutually opposite directions. These could thus be referred to as at least one right-handed/left-handed conveying spiral formed by the at least one first/second cooling channel. On the first/second end face, the at least one first/second cooling channel furthermore preferably opens out such that its imaginary elongation points—at least roughly—in the direction of the respective stator winding head. It is thus possible for the first/second cooling channel to open such that the cooling liquid can be centrifuged to the stator at a predefinable angle with respect to a tangent to the rotor.

In some embodiments, the geometry of the first and of the second cooling channel is configured such that, at an adequately high rotational speed of the rotor laminated core, the first/second cooling channel, which connects the inner region to the first/second end face, can draw in cooling liquid from the inner region, can convey said cooling liquid through the first/second cooling channel, can discharge said cooling liquid from the first cooling channel on the first/second end face, and, utilizing centrifugal forces acting on the cooling liquid, can centrifuge said cooling liquid onto the stator winding head in the region of the first/second end face. In this way, a defined distribution of the cooling liquid within the electric machine is made possible. After the cooling liquid has been centrifuged onto the stator winding heads, it can drip off the latter, be fed to the reservoir for cooling liquid, and be re-cooled, e.g. in a heat exchanger.

If the inner region is arranged at the same distance from both end faces of the rotor laminated core, particularly uniform cooling of the stator winding heads is made possible, because approximately the same quantity of cooling liquid can be centrifuged onto both stator winding heads. The cooling channels are suitable in particular for conveying oil, for example transmission oil or highly viscous oils, air, an aerosol or a liquid-air mixture, for example an oil foam.

In some embodiments, the rotor laminated core may be produced in the following way: The laminations are stacked in the stacking direction such that the apertures of laminations which are offset in the stacking direction are arranged offset with respect to one another in the circumferential direction of the laminations, such that at least one helical cooling channel is formed which runs through the rotor laminated core and which connects two opposite end faces of the rotor laminated core to one another.

In some embodiments, the apertures of laminations which are offset in the stacking direction of the rotor laminated core may, from one lamination to an immediately adjacent lamination, be arranged offset with respect to one another in the circumferential direction of the laminations. By means of this arrangement, a cooling channel with a particularly small helix angle can be formed by the apertures. In this way, a volume flow of coolant conducted through the at least one cooling channel can flow over a particularly large surface of the cooling channel, and in the process absorb a particularly large amount of heat from the rotor.

In some embodiments, the apertures of laminations which are offset in the stacking direction of the rotor laminated core are, from one partial laminated core to an immediately adjacent partial laminated core, arranged offset with respect to one another in a circumferential direction of the laminations. Here, a partial laminated core comprises in each case a multiplicity of laminations stacked one on top of the other. Within the partial laminated cores, the in particular congruent laminations are oriented identically in the circumferential direction, that is to say, within the partial laminated core, the apertures of laminations which are offset in the stacking direction are not arranged offset with respect to one another in the circumferential direction of the laminations. By means of this arrangement, cooling channels with a particularly large helix angle can be formed by means of the apertures, such that a volume flow of cooling medium conducted through the at least one cooling channel can pass through the cooling channel particularly quickly.

In some embodiments, the apertures of laminations of the rotor laminated core which are offset in the stacking direction may be arranged offset with respect to one another in the circumferential direction of the laminations by one groove step. A groove step is in this case the circumferential distance or the angular distance between two adjacent winding grooves. This unit of measurement for the displacement or for the offset arrangement permits particularly simple and exact manufacture of the laminated core with helical cooling channels formed by means of the apertures. Alternatively, the apertures of laminations which are offset in the stacking direction may also be arranged so as to be offset with respect to one another in the circumferential direction of the laminations by an integer multiple of a groove step, depending on the desired gradient of the cooling channel.

In some embodiments, a respectively left-handed or right-handed conveying spiral is formed by virtue of the individual laminations being rotationally offset in the same direction or opposite directions by at least one groove step. These may be arranged individually or together in combination on one shaft. If, in the case of the latter arrangement, openings or passages to the helical cooling channels are provided in the region of the reversal of the spindle flight, it is made possible for a cooling medium such as for example oil to be conveyed axially in both directions of the rotor via a bore in the rotor shaft. Here, the cooling medium, as it exits the conveying spirals, is centrifuged out radially in the direction of the stator winding heads owing to the centrifugal forces.

The cooling system described above is thus suitable both for drawing in a cooling medium by the rotor shaft and for intensively cooling the rotor by means of the flow through the conveying spirals. In the case of asynchronous machines, the short-circuiting rings, as hotspots, may be cooled directly with cooling liquid, for example oil. Furthermore, the cooling system is suitable for likewise particularly intensively cooling the stator winding heads of the electric machine by centrifuging coolant, for example oil, onto the stator winding heads. After the oil has dripped off and been re-cooled, in particular in a heat exchanger, it can be fed to the cooling circuit of the system again via the rotor shaft.

The above-described cooling system can be used in an electric machine in the form of a gearbox-integrated electric machine (GEM), which can act so as to assist an internal combustion engine of a motor vehicle, or in the form of a traction electric machine (TEM), which can on its own effect the propulsion of the motor vehicle.

In some embodiments, the feed line comprises a bore which runs axially within the rotor shaft and which connects an inner region of the rotor shaft to an end face of the rotor shaft, wherein a connecting line running within the rotor shaft connects the bore to the passage. The bore may comprise a central bore, in particular a blind bore. Furthermore, use may also be made of a hollow shaft or a passage bore which is closed at one side. The connecting line may for example likewise comprise a bore within the rotor shaft, which bore may run in a radial direction and be arranged at the same height in an axial direction as the at least one passage within the rotor laminated core, wherein said bore may in particular be a passage bore in the radial direction.

In some embodiments, multiple first cooling channels and second cooling channels are formed, which are connected to the feed line within the rotor shaft via multiple radially running passages, which are arranged so as to be distributed uniformly along the circumference, within the rotor laminated core. The laminations may each have multiple apertures arranged on a circular ring of the laminations, which apertures connect the end faces of the respective lamination to one another, wherein the apertures of laminations are offset in the stacking direction are arranged correspondingly offset with respect to one another in a circumferential direction of the laminations such that the multiple helical first and second cooling channels which run through the rotor laminated core are formed.

By means of the multiple cooling channels, a particularly large quantity of cooling liquid, in particular electrically insulating cooling liquid, can be guided through the rotor laminated core and centrifuged onto the stator winding heads. In this way, a particularly intensive dissipation of heat is made possible in the region of the rotor laminated core and of the stator winding heads.

The apertures may in particular be arranged equidistantly with respect to one another, whereby cooling channels running in parallel can be formed, which permit a particularly uniform dissipation of heat from the rotor laminated core. Between adjacent apertures, the lamination forms in each case one spoke. The spoke design that is realized in this embodiment permits a high level of rotor stiffness or rotor strength and a transmission of high torques.

In some embodiments, the rotor may include guide means for guiding the cooling liquid from the rotor to the stator winding heads. Said guide means make it possible for the coolant to be centrifuged in a particularly targeted and efficient manner onto the stator winding heads. The guide means may comprise at least one centrifuging disk and/or multiple vanes or blades, which are particularly suitable for guiding the cooling liquid.

If the electric machine is an asynchronous machine with short-circuiting rings arranged on the end faces of the rotor, on the short-circuiting rings, there may be blades for guiding the cooling liquid from the rotor to the stator winding heads. The blades make it possible for the cooling liquid to be guided from the inside outward, in the region of the end faces of the rotor laminated core, by assistance of the suction action of the conveying spirals. Here, the blades may in particular be of backwardly curved form. In some embodiments, the housing may, in an assisting manner, have guide means of the above-described type for guiding the cooling liquid from the rotor to the stator winding heads.

In some embodiments, the cooling liquid is not electrically conductive. In particular, oil may be used as cooling liquid, in particular transmission oil. In some embodiments, the electric machine has a recirculation cooling circuit with a pump and with a heat exchanger for cooling the cooling liquid, in particular oil. The pump can draw in the electrically insulating cooling liquid from the cooling liquid reservoir, convey said cooling liquid through the heat exchanger, where said cooling liquid is cooled by means of a second cooling medium, for example by means of cooling water of a main cooling circuit, and can subsequently convey said cooling liquid back into the cooling liquid reservoir.

In some embodiments, further cooling channels for cooling the electrically insulating cooling liquid are arranged in a wall of the housing. Within the further cooling channels, it is for example possible for cooling water of a main cooling circuit to be conveyed for the purposes of absorbing heat from the electrically insulating cooling liquid, in particular oil. In this alternative, a pump for conveying the electrically insulating cooling liquid can be omitted.

FIG. 1 shows a rotor 1 comprising a laminated core 2 and two short-circuiting rings 3 with blades 4. The rotor 1 is suitable for use in an electric machine 5 shown in FIG. 7 (for example in an asynchronous motor) with an integrated gearbox 6. The rotor laminated core 2 comprises multiple laminations 7 which are stacked one above the other in a longitudinal direction L of the rotor 1 and which are for the most part identical, wherein the laminations 7 have in each case five apertures 8, and the apertures 8 of all of the laminations 7 stacked one above the other form helical cooling channels 9.1 which run through the rotor laminated core 2.

Figure 2:
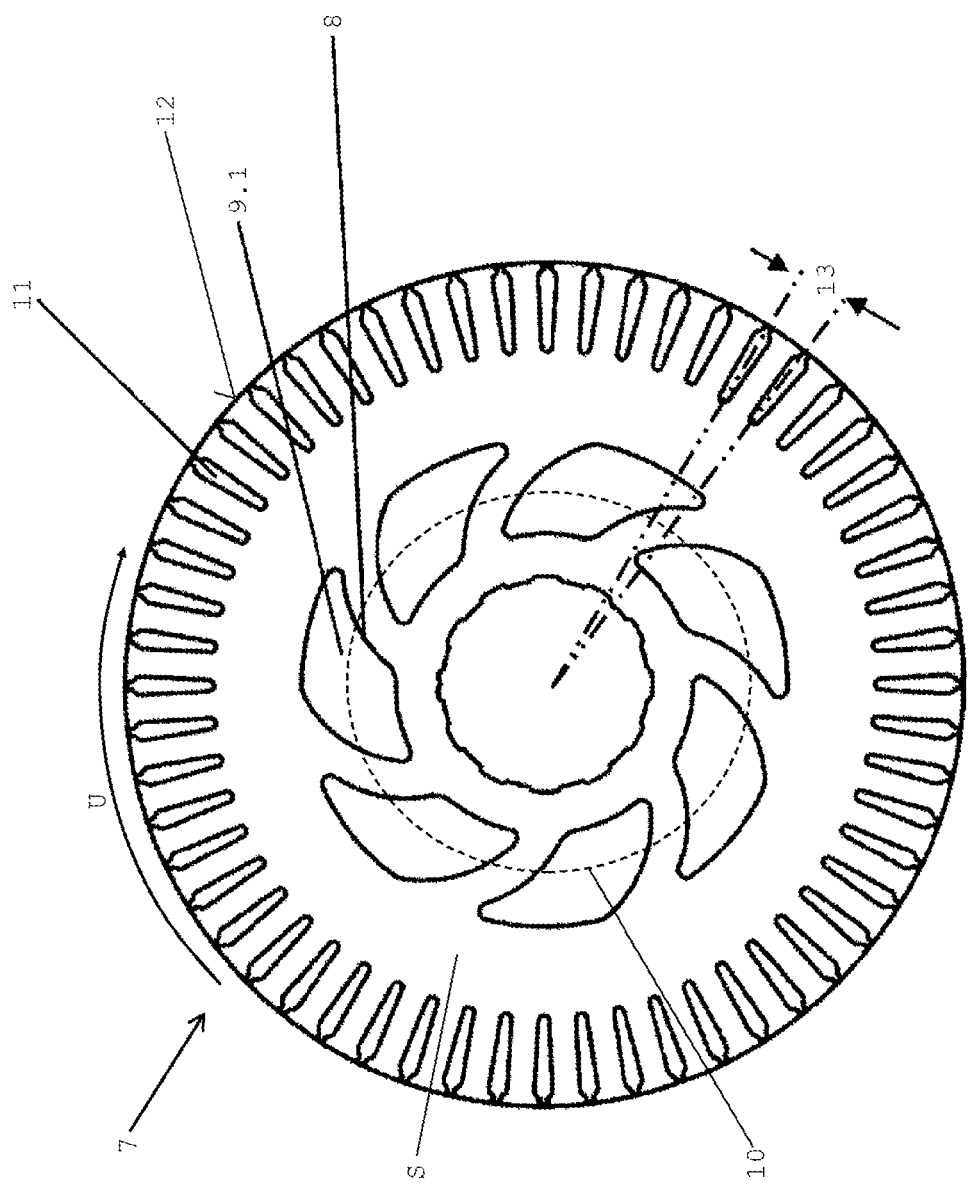
FIG. 2 shows a plan view of an individual lamination of a rotor laminated core, according to the teachings of the present disclosure.

FIG. 2 shows, by way of example, a lamination 7 of a rotor laminated core 2. Each of the seven punched apertures 8 of the lamination 7 connects opposite end faces S of the lamination 7 to one another and forms a section of seven helical cooling channels 9.1 which run parallel to one another, which cooling channels are formed by virtue of the individual laminations 7 being stacked congruently in the longitudinal direction L of the rotor 1 to form the rotor laminated core 2, wherein either each individual lamination 7, or packs of several laminations 7, are arranged offset with respect to one another in a circumferential direction U. The apertures 8 are arranged in each case on an imaginary circular ring 10 of the laminations 7. Between adjacent apertures 8, the lamination 7 forms in each case one spoke. Furthermore, the lamination 7 has multiple radially outwardly extending, identical winding grooves 11, which are distributed equidistantly, by in each case one groove step 13, along an outer circumference 12 of the lamination 7. The groove step 13 is in this case the circumferential distance or the angular distance between two adjacent winding grooves 11.

Figure 3:
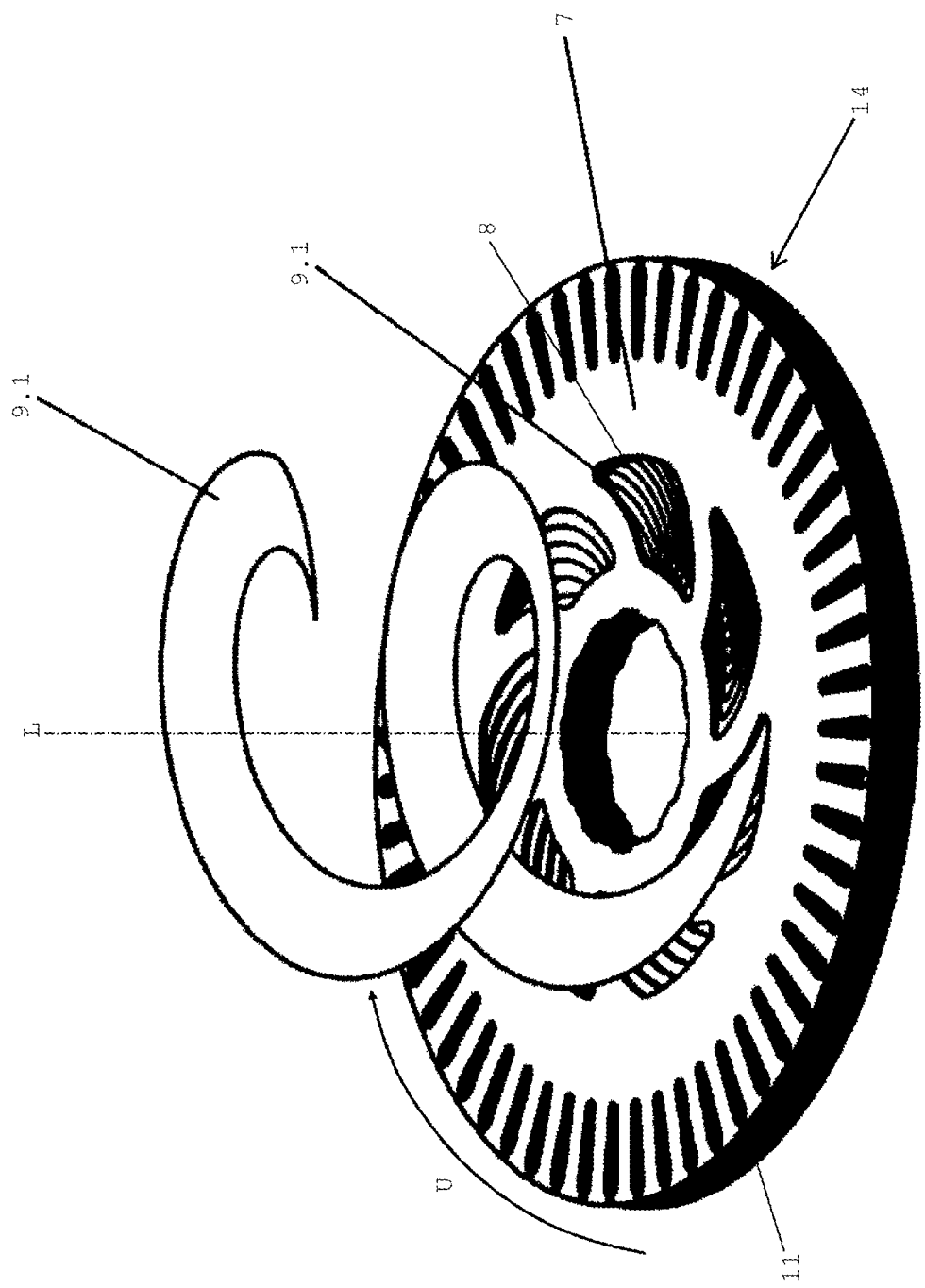
FIG. 3 shows a perspective view of multiple laminations as per FIG. 2 stacked one on top of the other, with the formation of cooling channels being illustrated.

As can be seen from FIG. 3, the laminations 7 are stacked in a manner rotationally offset with respect to one another to form a lamination stack 14, such that the apertures 8 of laminations 7 which are offset in the stacking direction L are, from one lamination to an immediately adjacent lamination, arranged so as to be offset with respect to one another in a circumferential direction U of the laminations 7. The apertures 8 of the laminations which are offset in the stacking direction L are in this case arranged so as to be offset with respect to one another in the circumferential direction U of the laminations 7 by in each case one groove step 13. This gives rise to a relatively small helix angle $\alpha$ of the cooling channel 9.1. The groove step 13 in this case constitutes the angular distance between two adjacent winding grooves 11. The apertures 8 thus form helical cooling channels 9.1, wherein the profile of one of said cooling channels 9.1 in the form of an Archimedes screw is, for illustrative purposes, illustrated in FIG. 3 partially without associated laminations 7. The cooling channels 9.1 run parallel to one another.

Figure 4:
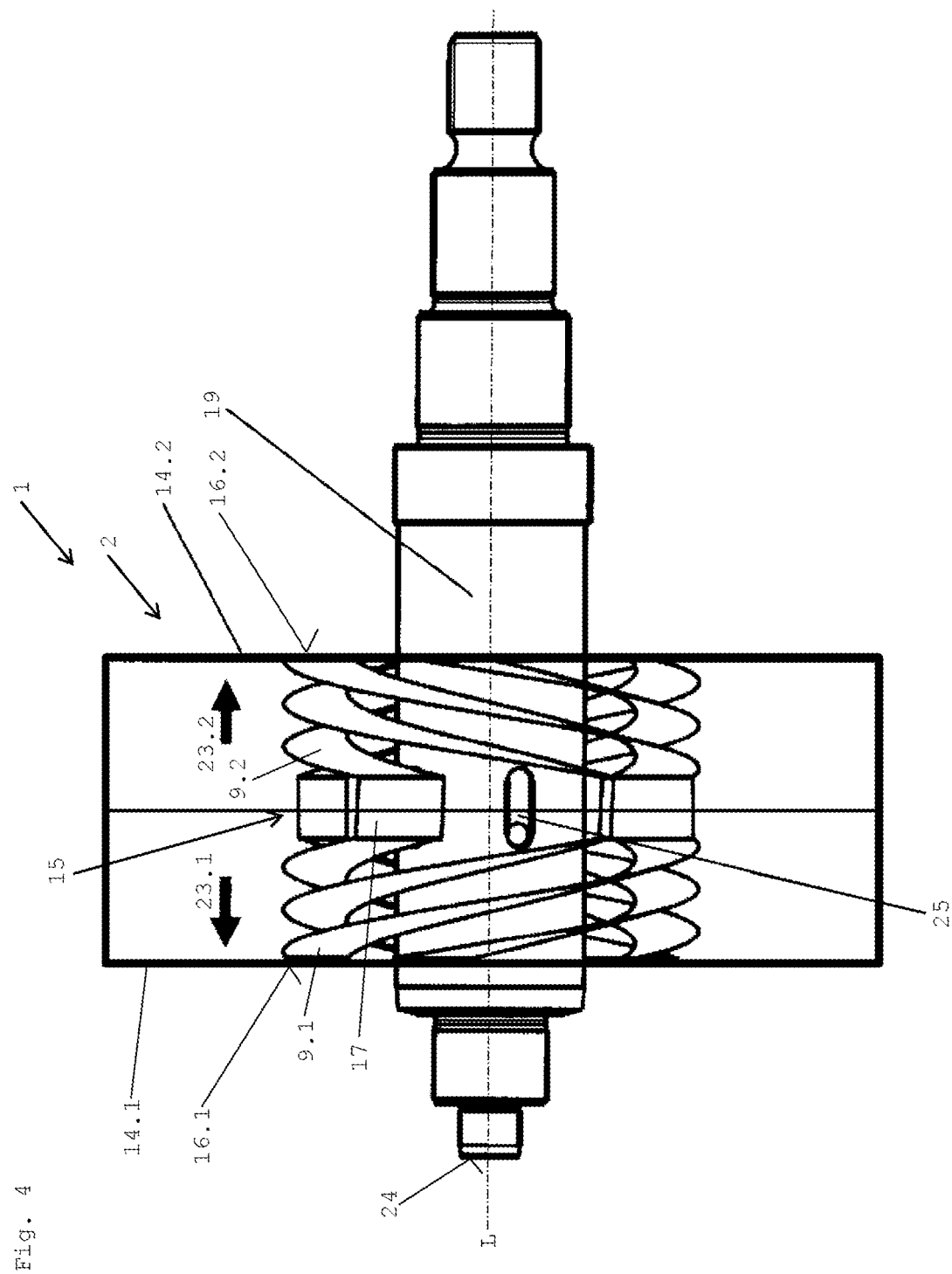
FIG. 4 shows a side view of a rotor shaft with a rotor laminated core with helical cooling channels, according to the teachings of the present disclosure.
Figure 5:
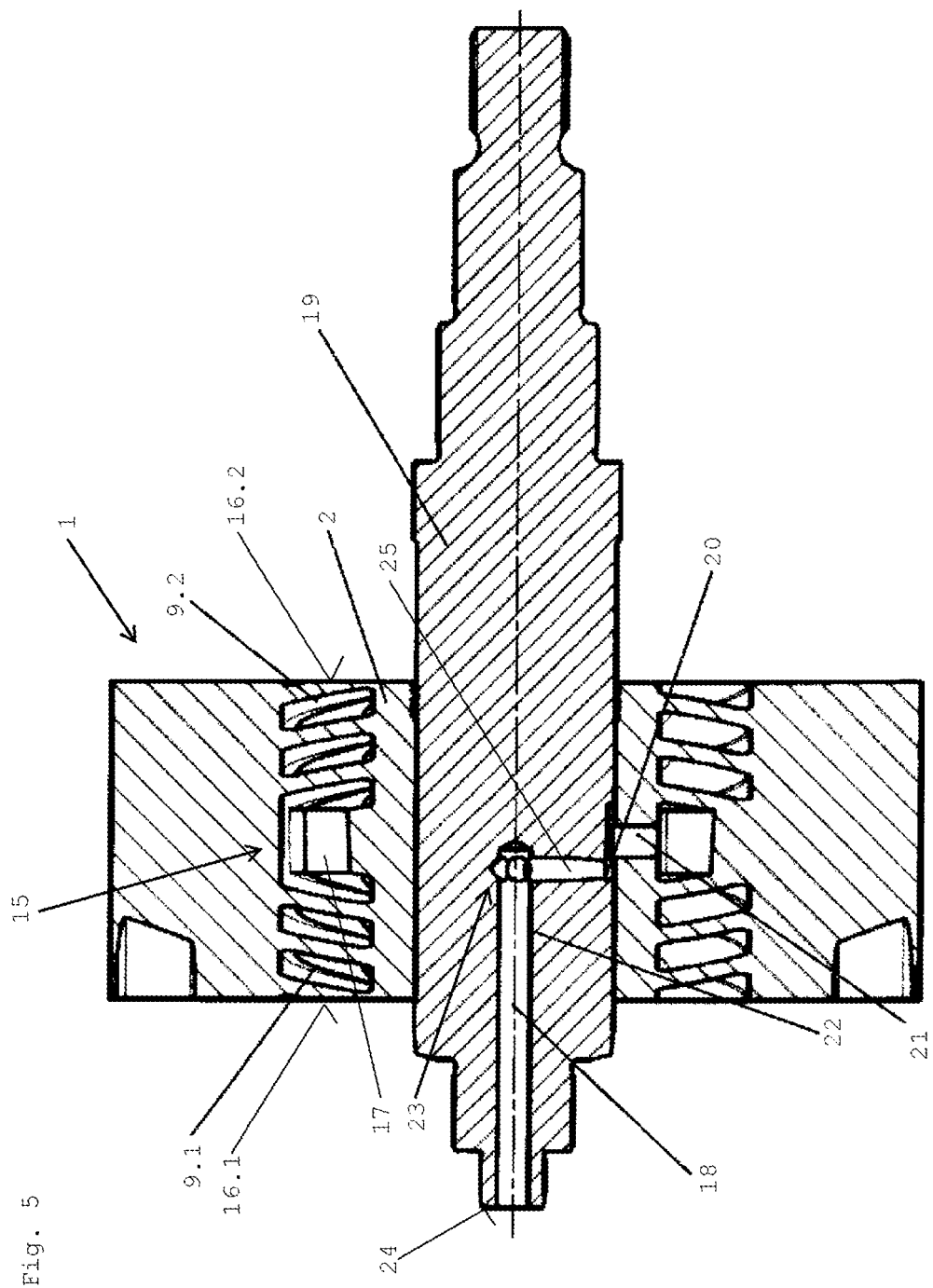
FIG. 5 shows a longitudinal sectional illustration of the rotor shaft with rotor laminated core with helical cooling channels as per FIG. 4.
Figure 6:
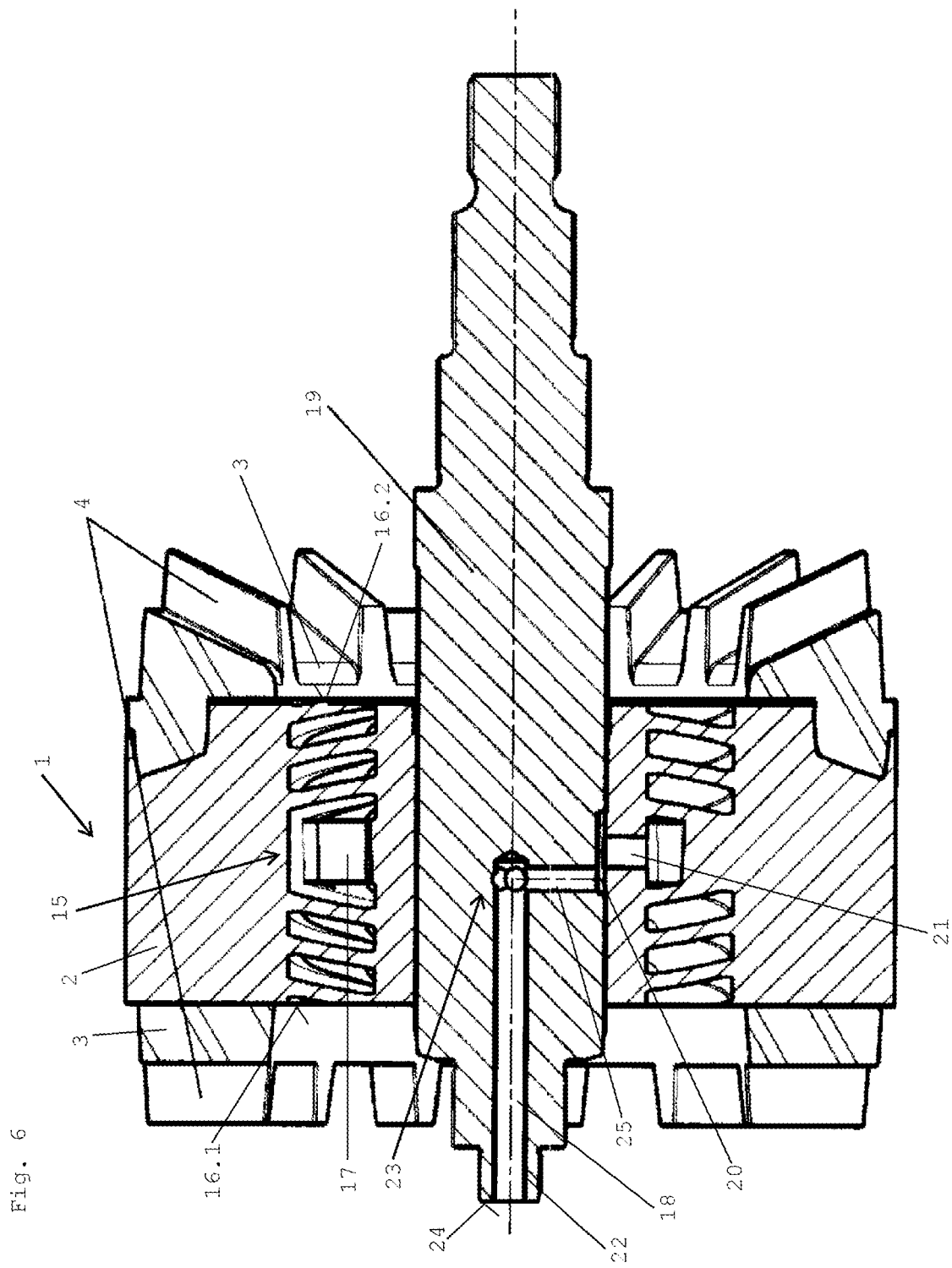
FIG. 6 shows a longitudinal sectional illustration of a rotor shaft with a rotor laminated core with helical cooling channels and with short-circuiting rings, according to the teachings of the present disclosure.

FIGS. 4 to 6 show that, after laminations 7 as described above have been stacked, a lamination stack 14 formed as a result has, as viewed in the longitudinal direction L, been divided in the middle. This gives rise to two partial lamination stacks 14.1 and 14.2 with the same number of laminations 7. Here, the partial lamination stack 14.2 is configured such that the stacking by at least one groove step runs in the opposite direction in relation to the partial lamination stack 14.1, with both partial lamination stacks 14.1 and 14.2 subsequently being joined together to form the rotor laminated core 2. In this way, in the first stack section 14.1, multiple left-handed conveying spirals in the form of the first helical cooling channels 9.1 have been formed, and in the second stack section 14.2, multiple right-handed conveying spirals in the form of the second helical cooling channels 9.2 have been formed.

The first and the second cooling channels 9.1 and 9.2 connect an inner region 15 of the rotor laminated core 2 to in each case one end face 16.1 and 16.2 of the rotor laminated core 2. The inner region 15 is, in relation to the longitudinal direction L of the rotor laminated core 2, a central inner cavity which is at the same distance from both end faces 16.1 and 16.2 of the rotor laminated core 2. The inner region 15 is a constituent part of multiple passages 16 which run radially through the laminated core and which connect the first and second cooling channels 9.1 and 9.2 to a feed line 18, which conducts cooling liquid, within a rotor shaft 19 on which the rotor laminated core 2 is rotationally conjointly mounted. The passages may have a groove 20 and a radially running bore 21 (FIGS. 5 and 6), wherein the groove 21 is, in the example shown, situated on the rotor shaft 19. The feed line 18 of the rotor 19 comprises a bore 22 which runs axially within the rotor shaft 19 and which connects an inner region 23 of the rotor shaft 19 to an end face 24 of the rotor shaft 19, wherein a connecting line 25 running radially within the rotor shaft 19 connects the bore 22 to the passages 17 of the rotor laminated core 2.

The cooling liquid is fed to the inner region 15 of the rotor laminated core 2 via the feed line 18 of the rotor shaft 19 and via the passages 17. Thus, the rotor shaft 19 and the rotor laminated core 2 together form a feed device for cooling liquid, wherein, when the rotor laminated core 2 rotates, the helical cooling channels 9.1 and 9.2 can draw in coolant via the feed line 18 of the rotor shaft 19 and via the passages 17 of the rotor laminated core 2, can convey said coolant through the cooling channels 9.1 and 9.2, and can centrifuge said coolant radially outward onto the stator winding heads 29 and 30 (FIG. 7) of the electric machine 5.

Here, the first and the second cooling channels 9.1 and 9.2 are oriented oppositely with respect to one another, that is to say the conveying directions 23.1 and 23.2 of the conveying spirals formed by the cooling channels 9.1 and 9.2 point in mutually opposite directions. These could thus be referred to as right-handed/left-handed conveying spirals which are formed by the first/second cooling channels 9.1/9.2. The geometry of the first and second cooling channels 9.1 and 9.2 is configured such that, at an adequately high rotational speed of the rotor shaft 19 and thus also of the rotor laminated core 2, cooling liquid is drawn in from the inner region 15, is conveyed through the first and second cooling channels 9.1 and 9.2, is discharged from the cooling channels 9.1 and 9.2 on the first and second end faces 16.1 and 16.2, and is thus centrifuged, utilizing centrifugal forces acting on the cooling liquid, onto the stator winding heads 29, 30.

Figure 7:
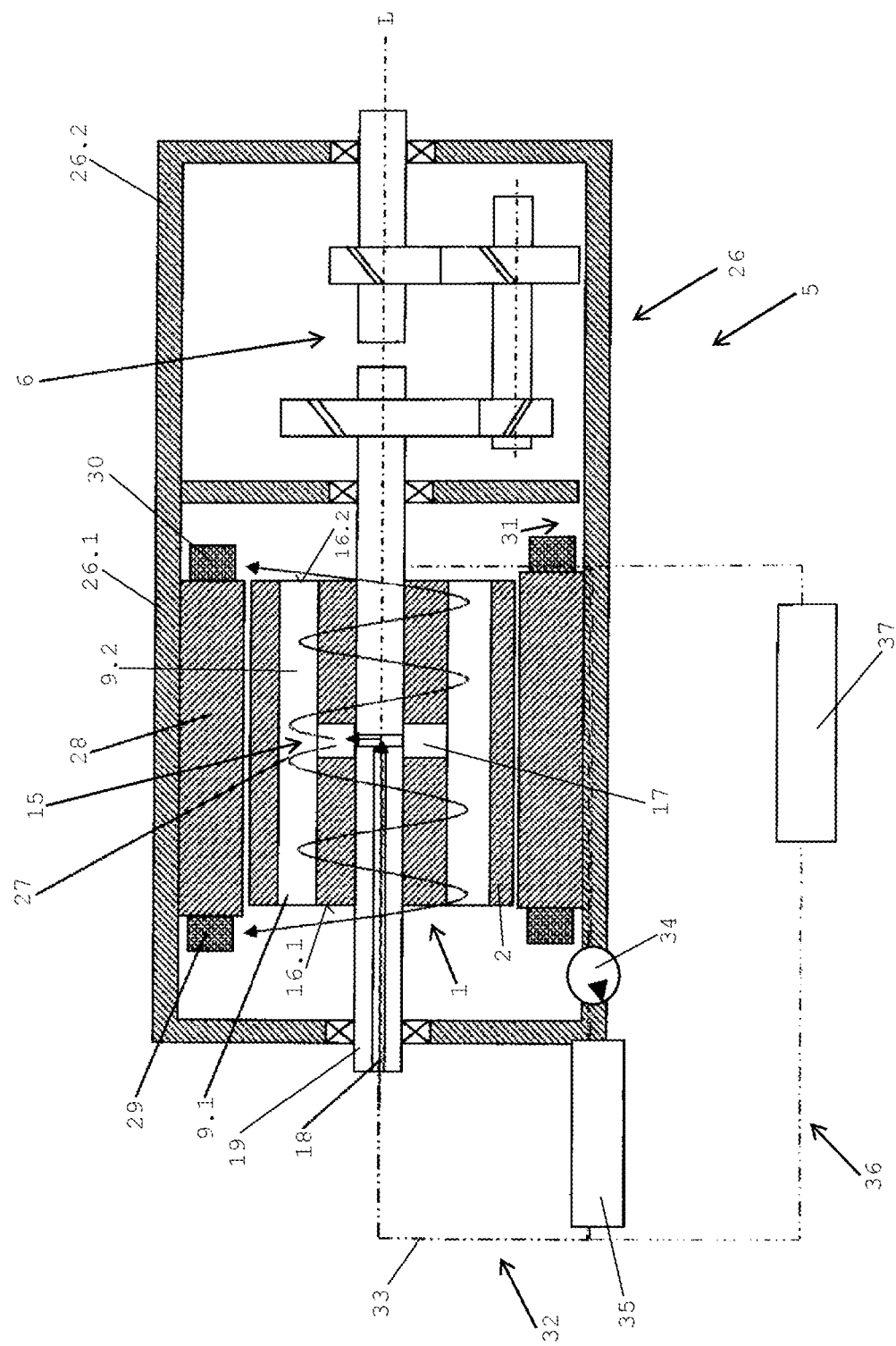
FIG. 7 shows a longitudinal section through a gearbox-integrated electric machine, according to the teachings of the present disclosure.

FIG. 7 shows an electric machine 5 having a housing 26 and having an oil cooling circuit 27, the conveying direction of which within the housing 26 is indicated by arrows. In a first section 26.1, illustrated in FIG. 7 on the left, of the housing 26, the rotor shaft 19 is mounted rotatably. The gearbox 6, which is driven by the rotor shaft 19, is accommodated in a second section 26.2, illustrated in FIG. 7 on the right, of the housing 26. A rotor 1 with a rotor laminated core 2 as per FIGS. 1 to 6 is mounted rotationally conjointly on the rotor shaft 19, such that, when the rotor shaft 19 rotates, the rotor 1 and the rotor laminated core 2 also rotate. The rotor 1 is radially surrounded, with a small spacing, by a static stator 28 which, on its two opposite end faces, has in each case one stator winding head 29 and 30 which project in an axial direction beyond two mutually opposite axial end faces of the rotor 1. In its lower region, the housing 26 furthermore forms a reservoir for cooling liquid, in the form of a sump 31 for oil, which serves in particular for cooling the rotor 1, stator 28 and gearbox 6.

After the oil has absorbed heat in particular from the rotor 1 and the stator 28, as will be illustrated below, it is re-cooled in a recirculation cooling circuit 32. The recirculation cooling circuit 32 comprises a coolant line 33, which is connected at an inlet side to the sump 31 and at an outlet side to the bore 22 of the feed line 18 of the rotor shaft 19. Arranged within the coolant line 33 is a conveying pump 34 which draws in oil from the sump 31 and conveys said oil via a heat exchanger 35 into the feed line 18. For the cooling of the oil within the heat exchanger 35, said heat exchanger is additionally flowed through by cooling water, which circulates in a main cooling circuit 36 and which is in turn cooled by a main water cooler 37.

When the rotor 1 is stationary, the oil collects in the sump 31. When the electric machine 5 is set in operation, the rotor shaft 19 rotates, and with it, the rotor 1 and the helical cooling channels 9.1 and 9.2 of the rotor laminated core 2 also rotate. As a result of the rotation of the helical cooling channels 9.1 and 9.2, oil is drawn in via the feed line 18 and via the passages 17, is conveyed through the cooling channels 9.1 and 9.2, and after emerging from the cooling channels 9.1 and 9.2, is centrifuged onto the stator winding heads 29 and 30. The blades 4, shown in FIGS. 1 and 6, of the short-circuiting rings 3 serve in this case for guiding the oil to the stator winding heads 29 and 30 after said oil has emerged from the cooling channels 9.1 and 9.2.

The oil, after having been centrifuged onto the winding heads 29 and 30, can drip off into the oil sump 31 and be re-cooled via the recirculation cooling circuit 32. It may alternatively also be provided that cooling channels are arranged in a wall of the housing 26, which cooling channels are flowed through for example by cooling water of the main cooling circuit 36 and serve for re-cooling the oil within the housing 26.

What is claimed is:

1. An electric machine comprising:
a rotor mounted on a rotor shaft having a rotor laminated core;
a stator with stator winding heads arranged on opposite end faces of the stator; and
a housing with a reservoir for a cooling liquid;
wherein the rotor laminated core comprises multiple laminations stacked in a stacking direction;
each of the multiple laminations has an aperture connecting end faces of the respective lamination to one another;
the apertures of respective laminations offset in the stacking direction are arranged offset with respect to one another in a circumferential direction of the multiple laminations such that: a first helical cooling channel is formed which runs through the rotor laminated core and connects an inner region of the rotor laminated core to a first end face of the rotor laminated core;
a second helical cooling channel is formed which runs through the rotor laminated core and connects the inner region of the rotor laminated core to a second end face situated opposite the first end face; and
the first helical cooling channel and the second helical cooling channel are oriented oppositely with respect to one another and are connected via a passage within the rotor laminated core to a feed line conducting the cooling liquid within the rotor shaft.

2. The electric machine as claimed in claim 1, wherein the feed line comprises a bore running axially within the rotor shaft and connecting an inner region of the rotor shaft to an end face of the rotor shaft; and
further comprising a connecting line running within the rotor shaft connects the bore to the passage.

3. The electric machine as claimed in claim 1, further comprising multiple first helical cooling channels and second helical cooling channels connected to the feed line within the rotor shaft via multiple radially running passages distributed uniformly along a perimeter of the rotor laminated core.

4. The electric machine as claimed in claim 1, wherein the rotor comprises guide means for guiding the cooling liquid from the rotor to the stator winding heads.

5. The electric machine as claimed in claim 4, wherein the guide means comprise at least one of a centrifuging disk and multiple vanes or blades.

6. The electric machine as claimed in claim 4, further comprising: an asynchronous machine with short-circuiting rings arranged on the end faces of the rotor; and blades disposed on the short-circuiting rings for guiding the cooling liquid from the rotor to the stator winding heads.

7. The electric machine as claimed in claim 6, wherein the blades are backwardly curved.

8. The electric machine as claimed in claim 1, wherein the housing comprises guide means for guiding the cooling liquid from the rotor to the stator winding heads.

9. The electric machine as claimed in claim 1, wherein the cooling liquid is not electrically conductive.

10. The electric machine as claimed in claim 1, further comprising a recirculation cooling circuit with a pump and a heat exchanger for cooling the electrically insulating cooling liquid.

11. The electric machine as claimed in claim 1, further comprising further cooling channels for cooling the electrically insulating cooling liquid arranged in a wall of the housing.

* * * * *